(12) United States Patent
Kisch et al.

(10) Patent No.: US 9,522,506 B2
(45) Date of Patent: Dec. 20, 2016

(54) METHODS FOR COMPOSITE TAPE LAMINATION OVER VARIOUS ANGLES BETWEEN FIBERS AND LINES TANGENT TO CONVEX RADII

(71) Applicant: The Boeing Company, Chicago, IL (US)

(72) Inventors: Robert A. Kisch, Auburn, WA (US); James Blades Andersen, Eatonville, WA (US)

(73) Assignee: THE BOEING COMPANY, Chicago, IL (US)

( * ) Notice: Subject to any disclaimer, the term of this patent is extended or adjusted under 35 U.S.C. 154(b) by 210 days.

(21) Appl. No.: 14/295,327

(22) Filed: Jun. 3, 2014

(65) Prior Publication Data

US 2014/0283981 A1   Sep. 25, 2014

Related U.S. Application Data

(63) Continuation-in-part of application No. 13/645,892, filed on Oct. 5, 2012, now Pat. No. 8,741,084.

(51) Int. Cl.
*B29C 70/02*   (2006.01)
*B29C 70/38*   (2006.01)

(52) U.S. Cl.
CPC ........ *B29C 70/386* (2013.01); *Y10T 156/1028* (2015.01)

(58) Field of Classification Search
CPC .................. B29C 70/386; Y10T 156/1028
USPC ........ 156/169, 212, 443, 459, 468, 469, 475
See application file for complete search history.

(56) References Cited

U.S. PATENT DOCUMENTS

| 5,041,179 | A | * | 8/1991 | Shinno | B29C 70/386 |
|---|---|---|---|---|---|
| | | | | | 156/361 |
| 6,390,169 | B1 | | 5/2002 | Johnson | |
| 8,741,084 | B2 | | 6/2014 | Kisch et al. | |
| 2010/0252183 | A1 | * | 10/2010 | Munaux | B29C 70/388 |
| | | | | | 156/202 |
| 2012/0234489 | A1 | | 9/2012 | De Mattia et al. | |
| 2014/0096898 | A1 | | 4/2014 | Kisch et al. | |

FOREIGN PATENT DOCUMENTS

| FR | 2943943 A1 | 10/2010 |
|---|---|---|
| GB | 2486230 A | 6/2012 |
| JP | S62144927 A | 6/1987 |

OTHER PUBLICATIONS

International Search Report and Written Opinion dated Dec. 5, 2013, regarding Application No. PCT/US2013/056763, 12 pages.
Office Action, dated Apr. 11, 2013, regarding U.S. Appl. No. 13/645,892, 15 pages.
Final Office Action, dated Sep. 12, 2013, regarding U.S. Appl. No. 13/645,892, 11 pages.
Notice of Allowance, dated Jan. 17, 2014, regarding U.S. Appl. No. 13/645,892, 11 pages.

* cited by examiner

*Primary Examiner* — Jacob T Minskey
*Assistant Examiner* — Vishal I Patel
(74) *Attorney, Agent, or Firm* — Yee & Associates, P.C.

(57) ABSTRACT

A tape laminating machine having a compaction roller lays up composite tape over a substrate having a convex radius. The compaction roller folds the tape as it moves over the convex radius, while simultaneously pivoting about a trailing edge of the tape to prevent the compaction roller from lifting off the tape laid just before the convex radius.

20 Claims, 11 Drawing Sheets

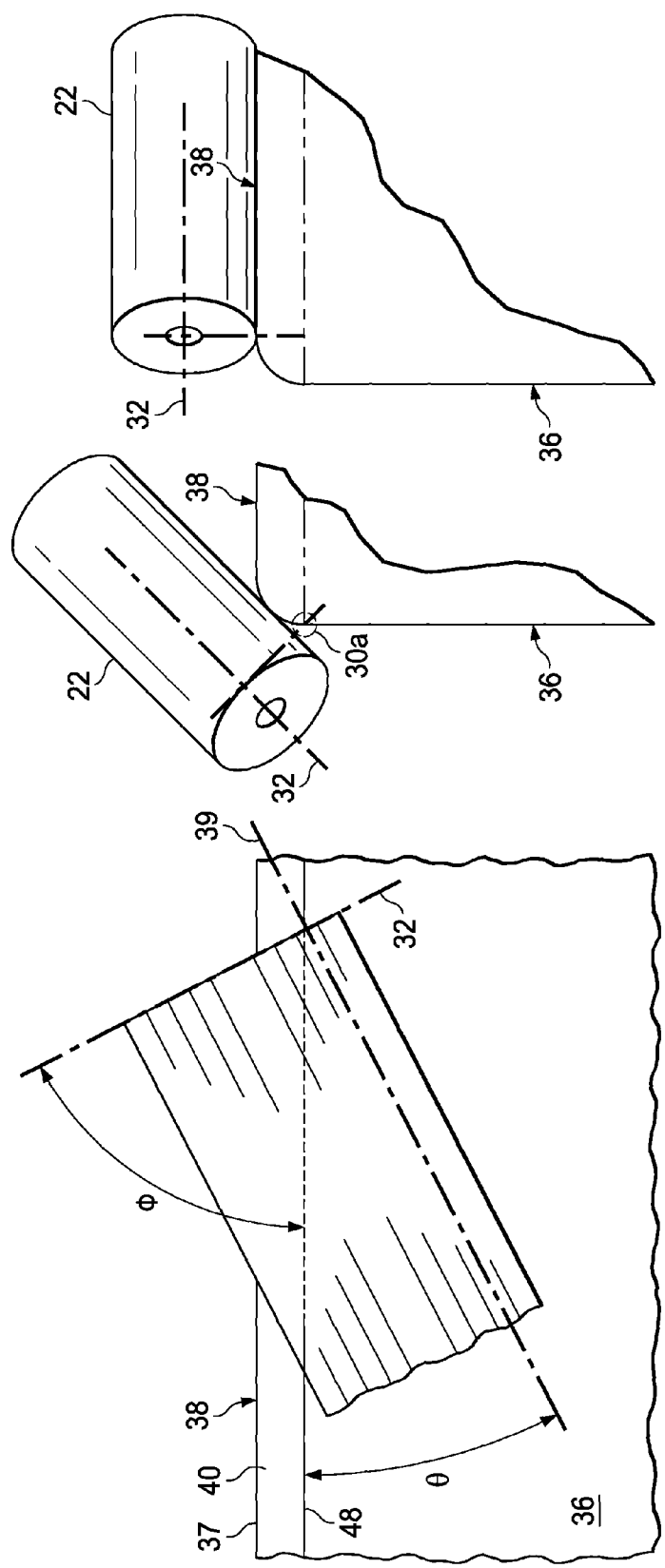

METHODS FOR COMPOSITE TAPE LAMINATION OVER VARIOUS ANGLES BETWEEN FIBERS AND LINES TANGENT TO CONVEX RADII

CROSS REFERENCE TO RELATED APPLICATIONS

The present application is a continuation-in-part (CIP) application of U.S. patent application Ser. No. 13/645,892, filed Oct. 5, 2012.

The present application is related to International Application Number PCT/US2013/056763 filed on Aug. 27, 2013, which also claims the benefit of U.S. patent application Ser. No. 13/645,892.

BACKGROUND INFORMATION

1. Field

The present disclosure broadly relates to fabrication of fiber reinforced composite laminates, and deals more particularly with a method of laminating composite tape over edges having convex radii.

2. Background

Composite laminate structures such as those used in the automotive, marine and aerospace industries may be fabricated using automated composite material application machines, commonly referred to as automated fiber placement (AFP) machines. AFP machines may be used in the aircraft industry, for example, to fabricate structural members and skin assemblies by wrapping relatively narrow strips of slit prepreg tape known as "tows", collimated into a wider band around a manufacturing tool or other substrate. AFP machines have a material application head that includes a plurality of tape control modules which align, cut and place the tape strips, typically six or more, "on-the-fly" under numeric control. The tape strips are aligned in continuous, edge-to-edge contact forming a single wide conformal bandwidth which is compacted against the tool using a compaction device such as a compaction roller or a shoe.

The plies forming the laminate structure may be made up of plies have differing fiber orientations, such as 0°, 45° and 90° plies, with each ply being formed by multiple courses of a conformal bandwidth of tape strips placed by the AFP machine. In some cases, depending upon the shape of the part, the substrate (e.g. the tool) may have one or more radius edges over which the tape strips must be applied and compacted. However, a problem sometimes exists where it is necessary to apply the tape strips at an angle, such as a 45° angle, over an edge having a relatively sharp, convex radius, such as a 90° convex radius. As the compaction device moves over the radius edge at an angle, the trailing edge of the conformal bandwidth of tape strips just laid before the radius edge may be lifted away from the substrate by continued movement of the compaction device over the radius edge, resulting in voids or wrinkles in the plies which can adversely affect the quality of the completed structure.

Accordingly, there is a need for a method of laminating composite tape over convex radius edges that reduces or eliminates voids or wrinkles in plies caused by lifting of the tape after it has been placed and compacted.

Additionally, the plies forming the laminate structure may be made up of plies with differing fiber orientations, including fiber orientations having the standard angles such as 0°, +45°, −45°, and 90° plies, in addition to fiber orientations comprising +30°, −30°, +60°, −60° and various other angles spanning from 0° to 180° in a positive and negative direction relative to a reference, with each ply being formed by multiple courses of a conformal bandwidth of tape strips placed by the AFP machine. In some cases, depending upon the shape of the part, the substrate (e.g. the tool) may have one or more radius edges over which the tape strips must be applied and compacted. However, a problem sometimes exists where it is necessary to apply the tape strips at an angle, such as, but not limited to a 45° angle, over an edge having a convex radius, such as, but not limited to a 90° convex radius. Further, multiple differing angles of fiber orientation within laminate plies may create various angles between the fibers and lines tangent to convex radii of the laminate plies. As the compaction device moves over the radius edge at these various angles, the trailing edge of the conformal bandwidth of tape strips just laid before the radius edge may be lifted away from the substrate by continued movement of the compaction device over the radius edge, resulting in voids or wrinkles in the plies. Stated differently, the tape strips just laid immediately preceding the current position of the compaction device, at a time when the angle between the fibers and the lines tangent to the radius was slightly different than while at the current angle, the trailing edge of the conformal bandwidth may be lifted away from the substrate by continued movement of the compaction device over the radius edge, resulting in voids or wrinkles in the plies which can adversely affect the quality of the completed structure.

Accordingly, there is a need for a method of laminating composite tape over convex radius edges having various angles between fibers in the composite laminates and lines tangent to the convex radius edges that reduces or eliminates voids or wrinkles in plies caused by lifting of the tape after it has been placed and compacted.

SUMMARY

The disclosed embodiments provide a method of laminating composite tape over a relatively sharp convex radius edge, where the tape is applied with a fiber orientation that forms an angle, such as a 45° angle relative to the convex radius edge. The method reduces or eliminates lifting of just-laid tape away from the substrate at the radius edge, as a compaction roller traverses over the radius edge.

According to one disclosed embodiment, a method is provided of laminating composite tape over a convex radius edge on a substrate. The method comprises moving a material placement head over the substrate toward and around the convex radius edge, and laying down a bandwidth of the composite tape strips on the substrate as a material placement head moves over the substrate and around the convex radius edge, including using a compaction device to compact the tape strips against the substrate. The method further includes preventing the compaction device from lifting off tape strips laid near the convex radius edge by pivoting the compaction device around a trailing edge of the bandwidth in contact with the convex radius edge. The method also includes folding in the bandwidth of the tape strips as the material placement head moves around the convex radius edge. The compaction device has a longitudinal axis and a tool center point lying along the longitudinal axis at one end of the compaction device, and pivoting the compaction device around the trailing edge of the bandwidth of tape strips includes pivoting the compaction device about the tool center point. Laying down the bandwidth of tape strips includes laying down a plurality of tape strips side-by-side in the substrate, and pivoting the compaction device includes pivoting the compaction device at a point lying along one of the tape strips near an edge of the bandwidth. Pivoting the compaction device is performed as the material placement head moves around the convex radius edge. The compaction device may be a compaction roller having an axis of rotation that is angularly offset form the convex radius edge. In one embodiment, the axis of rotation of the compaction roller is angularly offset from the convex radius edge by approximately 45°. Contact between the compaction device and the substrate is maintained throughout the movement of the material placement head around the convex radius edge.

According to another disclosed embodiment, a method is provided of laying down prepreg fibers on a substrate having two surfaces connected by a radius edge. The method comprises moving a composite material placement head across a first substrate surface at an angle to the radius edge, and laying down a bandwidth of prepreg fibers on the first substrate surface. The method further comprises moving the material placement head around the radius edge from the first substrate surface to a second substrate surface, and pivoting the material placement head about a point near one edge of the bandwidth of the prepreg fibers as the material placement head moves around the radius edge. The method may further comprise moving the material fiber placement head from a radius edge across the second substrate surface at an angle to the radius edge, and laying down a bandwidth of the prepreg fibers on the second substrate surface. Laying down a bandwidth of the prepreg fibers on the first substrate surface includes laying down strips of fiber tows in side-by-side, edge to edge contact with each other, and compacting the strips of fiber tows. The point about which the material placement head is pivoted is located within one of the strips of fiber tows near one edge of the bandwidth of prepreg fibers. Compacting the strips of fiber tows is performed using a compaction roller, and pivoting the material placement head includes pivoting the compaction roller about a tool center point lying near one end of the compaction roller. The method further comprises folding the bandwidth of prepreg fibers as the material placement head is moved around the radius edge from the first substrate surface to the second substrate surface. The angle of movement of the material placement head to the radius edge may be approximately 45°.

According to still another embodiment, a method is provided of laminating composite tows over a convex radius using a material placement head having a compaction roller. The method comprises moving the material placement head around the convex radius as composite tows are being laminated in a bandwidth over the convex radius. The method further comprises pivoting the compaction roller at a location across the bandwidth that prevents a compaction roller from lifting off the tows laid just before the material placement head begins moving around the convex radius. The method also includes folding the bandwidth of prepreg tows as the compaction roller moves around the convex radius. The location across the bandwidth about which the compaction roller is pivoted is between a center tow and a last tow along the trailing edge of the bandwidth.

According to a further embodiment, a method is provided of laminating composite tape over a convex radius using a tape laminating machine having a compaction roller. The method comprises programming the tape laminating machine to move along a path over a substrate, and directing the compaction roller to move along the path and pivot around a trailing edge of the tape that contacts the convex radius to prevent the compaction roller from lifting off the tape played just before the convex radius. The method also includes folding the tape as the compaction roller moves over the convex radius. The method may further comprise digitally defining a composite layup having a convex radius, and using the tape laminating machine to layout plies of the digitally defined layup. The tape laminating machine may be programmed such that the tape laminating machine moves along a modified path for laying up plies respectively having 0°, 45° and 90° fiber orientations. Directing the compaction roller to move along the path and pivot around a trailing edge of the tape is performed while folding the tape as the compaction roller moves over the convex radius.

The following illustrated embodiments provide a method of laminating composite tape over a convex radius edge, where the tape is applied with a fiber orientation that forms an angle, wherein the angle can be any angle ranging from 0° to 180° in a positive and negative direction relative to the convex radius edge. The method reduces or eliminates lifting of just-laid tape or tape that was laid at a prior position of a compaction device, immediately preceding the current position of the compaction device, at a time when the angle between the fibers and the lines tangent to the radius was slightly different than the current angle, away from the substrate and the convex radius edge, as the compaction roller traverses over the convex radius edge.

According to one illustrated embodiment, a method is provided of laminating composite tape over a convex radius edge on a substrate. The method comprises moving a material placement head over the substrate toward and around the convex radius edge, and laying down a bandwidth of the composite tape strips on the substrate is a material placement head moves over the substrate and around the convex radius edge, including using a compaction device to compact the tape strips against the substrate. The method further includes for preventing the compaction device from lifting off tape strips laid near the convex radius edge by pivoting the compaction device around a trailing edge of the bandwidth in contact with the convex radius edge. The method also includes folding in the bandwidth of the tape strips as the material placement head moves around the convex radius edge. The compaction device has a longitudinal axis and a tool center point lying along the longitudinal axis at one end of the compaction device, and pivoting the compaction device around the trailing edge of the bandwidth of tape strips includes pivoting the compaction device about the tool center point. Laying down the bandwidth of tape strips includes laying down a plurality of tape strips side-by-side on the substrate, and pivoting the compaction device includes pivoting the compaction device at a point lying along one of the tape strips near an edge of the bandwidth. Pivoting the compaction device is performed as the material placement head moves around the convex radius edge. The compaction device may be a compaction roller having an axis of rotation that is angularly offset from the convex radius edge. In one embodiment, the axis of rotation of the compaction roller is angularly offset from the convex radius edge by approximately 45°. In a second embodiment, the axis of rotation of the compaction roller is angularly offset from the convex radius edge by a low angle less than 45°. In a third embodiment, the axis of rotation of the compaction roller is angularly offset from the convex radius edge by a high angle greater than 45°. Contact between the compaction device and the substrate is maintained throughout the movement of the material placement head around the convex radius edge, in each of the first, second, and third embodiments of this method.

According to another illustrated embodiment, a method is provided of laying down prepreg fibers on a substrate having two surfaces connected by a radius edge. The method comprises moving a composite material placement head across a first substrate surface at an angle to the radius edge, and laying down a bandwidth of prepreg fibers on the first substrate surface. The method further comprises moving the material placement head around the radius edge from the first substrate surface to a second substrate surface, and pivoting the material placement head about a point near one edge of the bandwidth of the prepreg fibers as the material placement head moves around the radius edge. The method may further comprise moving the material fiber placement head from a radius edge across the second substrate surface and an angle to the radius edge, and laying down a bandwidth of the prepreg fibers on the second substrate surface. Laying down a bandwidth of the prepreg fibers on the first substrate surface includes laying down strips of fiber tows in side-by-side, edge to edge contact with each other, and compacting the strips of fiber tows. The point about which the material placement head is pivoted is located within one of the strips of fiber tows near one edge of the bandwidth of prepreg fibers. Compacting the strips of fiber tows is performed using a compaction roller, and pivoting the material placement head includes pivoting the compaction roller about a tool center point lying near one end of the compaction roller. The method further comprises folding the bandwidth of prepreg fibers as the material placement head is moved around the radius edge from the first substrate surface to the second substrate surface. The angle of movement of the material placement head to the radius edge may be approximately 45°, a low angle less than 45°, or a high angle greater than 45°.

According to still another embodiment, a method is provided of laminating composite tows over a convex radius using a material placement head having a compaction roller. The method comprises moving the material placement head around the convex radius as composite tows are being laminated in a bandwidth over the convex radius. The method further comprises pivoting the compaction roller at a location across the bandwidth that prevents a compaction roller from lifting off the tows laid just before the material placement head begins moving around the convex radius. The method also includes folding the bandwidth of prepreg tows as the compaction roller moves around the convex radius. The location across the bandwidth about which the compaction roller is pivoted is between a center tow and a last tow along the trailing edge of the bandwidth.

According to a further illustrated embodiment, a method is provided of laminating composite tape over a convex radius using a tape laminating machine having a compaction roller. The method comprises programming the tape laminating machine to move along a path over a substrate, and directing the compaction roller to move along the path and pivot around a trailing edge of the tape that contacts the convex radius to prevent the compaction roller from lifting off the tape played just before the convex radius. The method also includes folding the tape as the compaction roller moves over the convex radius. The method may further comprise digitally defining a composite layup having a convex radius, and using the tape laminating machine to layout plies of the digitally defined layup. The tape laminating machine may be programmed such that the tape laminating machine moves along a modified path for laying up plies respectively having differing specified fiber orientations which may include, for example and without limitation, 0°, 30°, 45°, 60°, and 90° fiber orientations. Directing the compaction roller to move along the path and pivot around a trailing edge of the tape is performed while folding the tape as the compaction roller moves over the convex radius.

According to another illustrated embodiment, a method is provided of laminating composite tape over a convex radius edge on a substrate. The method comprises moving a material placement head over the substrate toward and around the convex radius edge, and laying down a bandwidth of the composite tape strips on the substrate is a material placement head moves over the substrate and around the convex radius edge, including using a compaction device to compact the tape strips against the substrate. The method further includes for preventing the compaction device from lifting off tape strips laid near the convex radius edge by pivoting the compaction device around a trailing edge of the bandwidth in contact with the convex radius edge. The method also includes folding in the bandwidth of the tape strips as the material placement head moves around the convex radius edge. The compaction device has a longitudinal axis and a tool center point lying along the longitudinal axis at one end of the compaction device, and pivoting the compaction device around the trailing edge of the bandwidth of tape strips includes pivoting the compaction device about the tool center point. Laying down the bandwidth of tape strips includes laying down a plurality of tape strips side-by-side on the substrate, and pivoting the compaction device includes pivoting the compaction device at a point lying along one of the tape strips near an edge of the bandwidth. Pivoting the compaction device is performed as the material placement head moves around the convex radius edge. The compaction device may be a compaction roller having an axis of rotation that is angularly offset from the convex radius edge. In one embodiment, the axis of rotation of the compaction roller is angularly offset from the convex radius edge by approximately 45°. In a second embodiment, the axis of rotation of the compaction roller is angularly offset from the convex radius edge by a low angle less than 45°. In a third embodiment, the axis of rotation of the compaction roller is angularly offset from the convex radius edge by a high angle greater than 45°. Contact between the compaction device and the substrate is maintained throughout the movement of the material placement head around the convex radius edge, in each of the first, second, and third embodiments of this method.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 11A is an illustration of the compaction roller depicted in FIGS. 9A and 9B, at the start of rotation of the compaction roller around an axis of rotation that is angularly offset from the convex radius edge by a low angle less than 45° as the radius edge is traversed by the compaction roller in accordance with an illustrative embodiment, showing a close-up view of the angles θ and Φ.

FIG. 11B is an illustration of the compaction roller depicted in FIG. 11A, showing the start of rotation of the compaction roller around an axis of rotation that is angularly offset from the convex radius edge by a low angle less than 45° as the radius edge is traversed by the compaction roller in accordance with an illustrative embodiment.

FIG. 12 is an illustration of the compaction roller depicted in FIGS. 11A and 11B, showing the compaction roller in a final position on a substrate after traversal of the radius edge.

DETAILED DESCRIPTION

Figure 1:
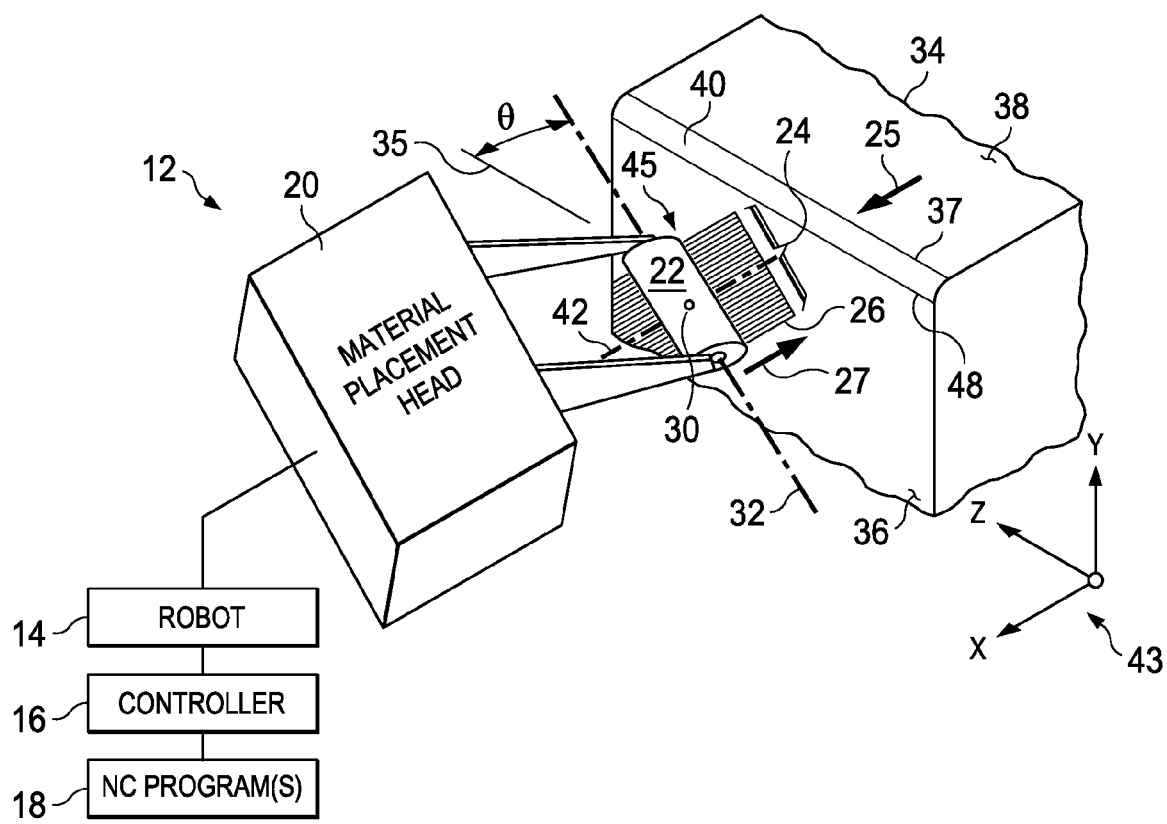
FIG. 1 is an illustration of a perspective view of a tape laminating machine laying down composite tape over a substrate having a convex radius edge.

Referring first to FIG. 1, an automatic fiber placement (AFP) machine 12 includes a material placement head 20 whose movements may be controlled by a robot 14 suitable for the application. The robot 14, as well as the functions of the material placement head 20 are controlled by a controller 16 which may comprise, without limitation, a CNC (computer numerically controlled) controller or a computer employing one or more NC programs 18. The material placement head 20 may be similar to those described in U.S. Pat. No. 7,213,629, U.S. patent application Ser. No. 12/038,155 filed Feb. 27, 2008, and US Patent Publication No. 20070029030 published Feb. 8, 2007, the entire contents of which are incorporated by reference herein. The material placement head 20 may include a material supply system (not shown) and a plurality of tape control modules (not shown) which may include rethread mechanisms, material guides, and material cutting mechanisms, all not shown but well known in the art.

The material placement head 20 feeds 25 a conformal bandwidth 24, sometimes also referred to herein as a tape bandwidth 24, of composite tape strips 26 in the form of tape strips, prepreg tows or other rovings to a nip 45 between a compaction device such as a compaction roller 22, and a substrate 34 which may comprise a tool or a previously laid ply of composite material. As used herein, "tape strips" is intended to include reinforced and reinforced plastic strips, prepreg tapes, tows and other rovings, and "bandwidth" and "conformal bandwidth" are intended to include a plurality of tape strips arranged in continuous side-by-side, substantially edge-to-edge contact with each other. Other compaction devices, such as a shoe may be used to place the conformal bandwidth 24 onto the substrate 34. The compaction roller 22 is cylindrical in shape and has an axis of rotation 32 as well as a tool center point 30. The material placement head 20 moves the compaction roller 22 over the substrate 34, compacting the conformal bandwidth 24 onto the substrate 34. Each pass of the material placement head 20 over the substrate 34 results in the placement of a course of tape strips 26 forming conformal bandwidth 24, and multiple passes of the material placement head 20 result in the formation of plies (not shown) of composite material being laid down on and compacted against the substrate 34.

The substrate 34 may have non-parallel substrate surfaces 36, 38 that are connected together along a convex radius edge 40. The material placement head 20 may place courses of the conformal bandwidths 24 of tape strips 26 at various angles of fiber orientation including, but not limited to 0°, 45° and 90° orientations relative to a reference axis 35 which corresponds to a horizontal or Z axis in the XYZ coordinate system 43. In FIG. 1, the material placement head 20 has partially placed a bandwidth 24 of tape strips twenty-six over one substrate surface 36 and is moving in a direction 27 toward the radius edge 40 at an angle θ, which may be, for example and without limitation, a 45° angle. As will be discussed below in more detail, the compaction roller 22 moves from the substrate surface 36 up around the radius edge 40, and then across substrate surface 38 during placement of a tape course.

Figure 2A:
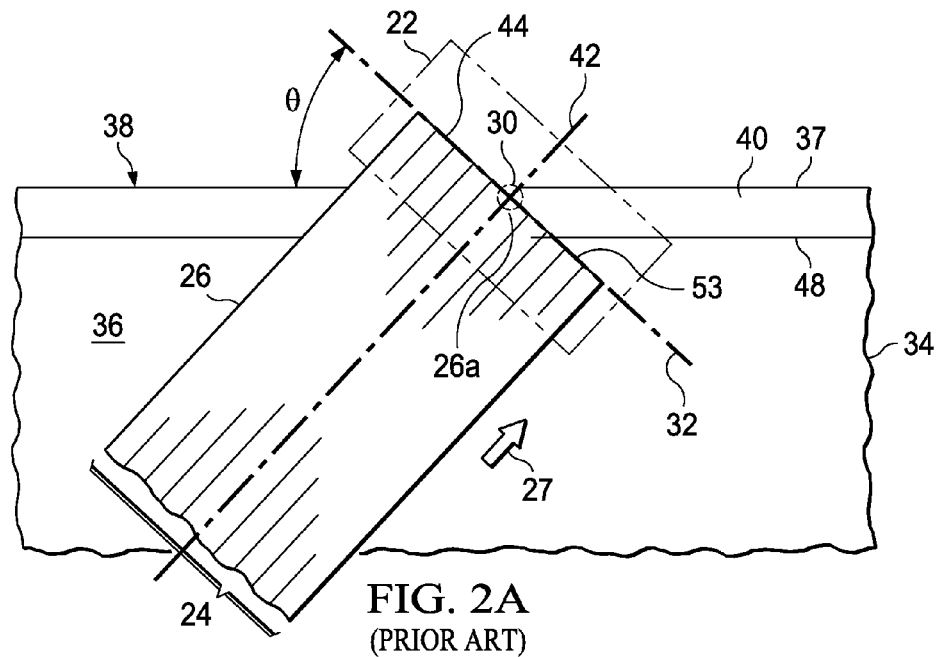
FIG. 2A is an illustration of a front view of a conformal bandwidth of tape being placed over a convex radius edge using a prior art method.
Figure 2B:
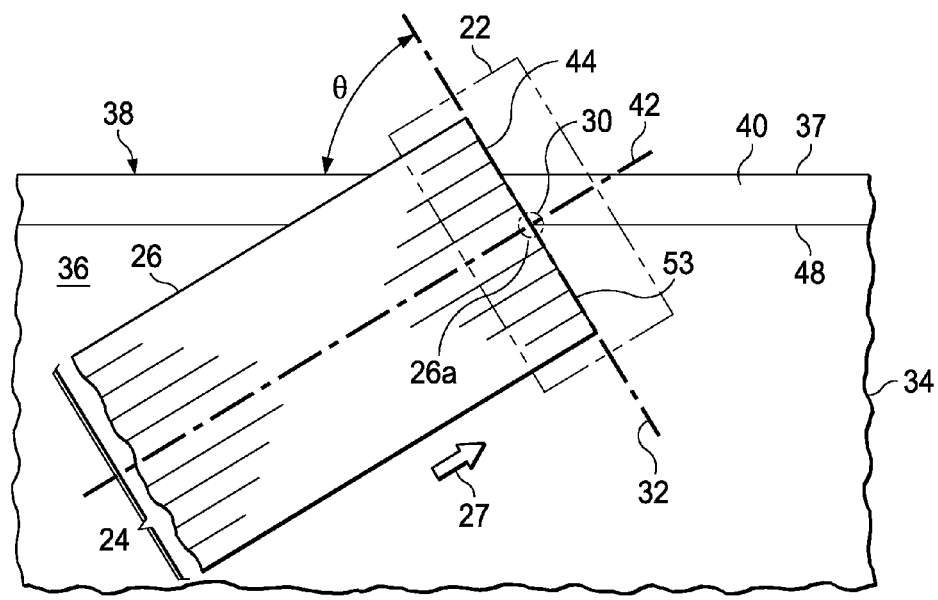
FIG. 2B is an illustration of the conformal bandwidth of tape shown in FIG. 2A, and further illustrating that rotation about the radius typically begins at the tangent intersection of the radius.
Figure 3:
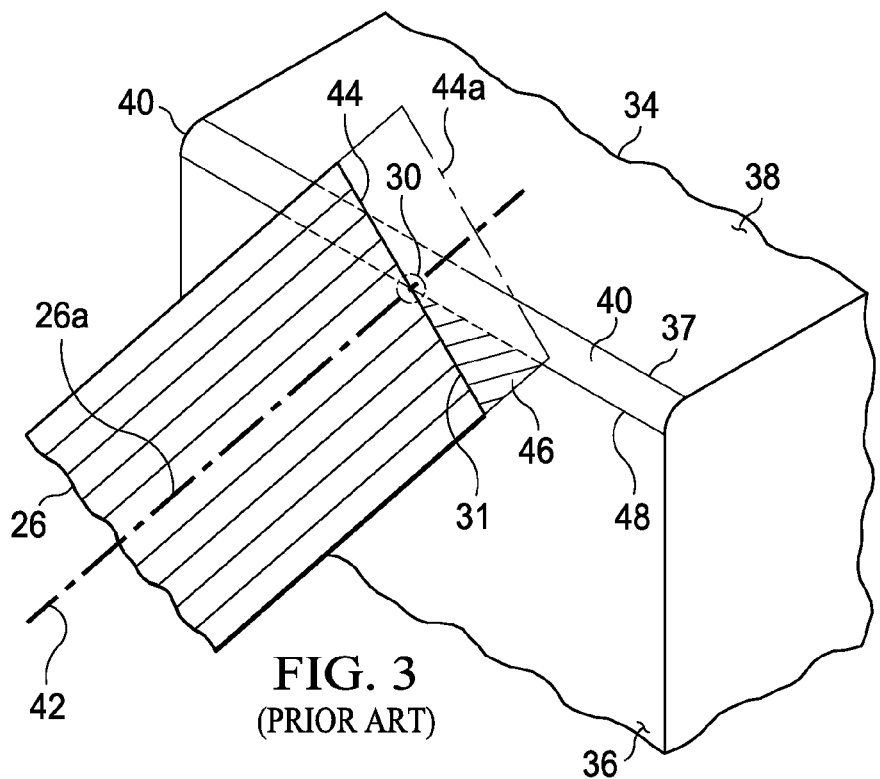
FIG. 3 is an illustration of the substrate shown in FIG. 1, showing an area of the bandwidth that is pulled away from the substrate when using the prior art method.

Attention is now directed to FIGS. 2A-4 which illustrate a prior art method of placing composite tape strips 26 in a conformal bandwidth 24 over a convex radius edge 40. As shown in FIGS. 2A and 3, the tool center point 30 of the compaction roller 22 lies substantially midway between the two ends of the compaction roller 22, and along the centerline 42 of the center tape strip 26a in the conformal bandwidth 24. Because the compaction roller 22 moves toward the radius edge 40 at an angle θ, when the tool center point 30 reaches the beginning of the radius edge 40, the leading edge 44 of the conformal bandwidth 24 has moved up above and begins to move over the radius edge 40 while the just-laid trailing edge 31 of the conformal bandwidth 24 remains beneath the radius edge 40.

FIG. 2B clarifies that in the prior art method, rotation typically begins at the tangent intersection of the first side 48 of convex radius edge 40, rotation commencing about convex radius edge 40. Additionally, FIG. 2B highlights that convex radius edge 40 has a first side 48 and a second side 37. Thus, during movement of the compaction roller along substrate surface 36, traversing over convex radius edge 40, and then commencing to compact the tape bandwidth 24 onto the substrate surface 38, the first side 48 of the radius edge 40 is defined as the first or initial side of the radius edge 40 that the compaction roller 22 reaches during the movement, as described above. Hence, it logically follows that second side 37 of radius edge 40 is defined as the second consecutive side the compaction roller 22 reaches during the movement, and upon moving over second side 37, the compaction roller begins movement along substrate surface 38.

Figure 4:
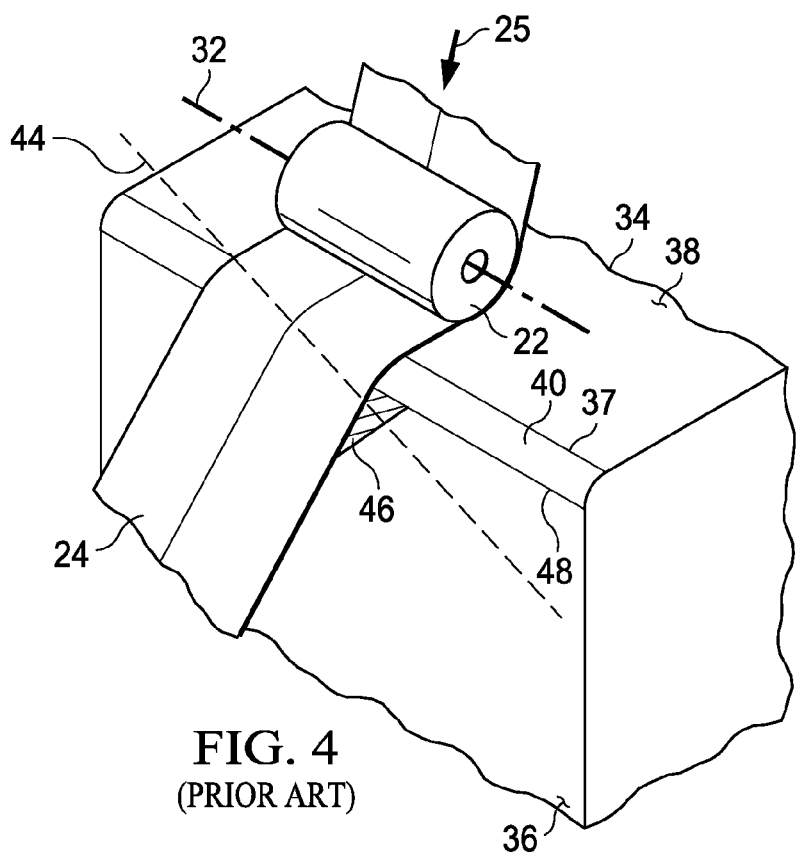
FIG. 4 is an illustration similar to FIG. 3, but showing the compaction roller having folded the bandwidth of tape around the radius edge using the prior art method.

When the tool center point 30 reaches the radius edge 40, it begins moving up over the radius edge 40 onto the substrate surface 38. During this movement of the compaction roller 22 over the radius edge 40, the pressure applied by the compaction roller 22 to the trailing edge of the tape bandwidth 24 is reduced, while compaction pressure continues to be applied to the leading edge 44 of the tape bandwidth 24. This differential in compaction pressure being applied to the tape bandwidth 24 causes an area of the tape bandwidth 24 along the trailing edge 31 represented by the crosshatching 46 to pull away from the substrate surface 36, resulting in potential voids or wrinkling of the laminate structure. FIG. 4 shows compaction roller 22 having traversed around the radius edge 40, and beginning to compact the tape bandwidth 24 onto the substrate surface 38. As can be seen in FIG. 4, although the tape bandwidth 24 is applied around the radius edge 40, an area 46 of the tape bandwidth 24 is not tightly compacted against the substrate surface 36.

Figure 5:
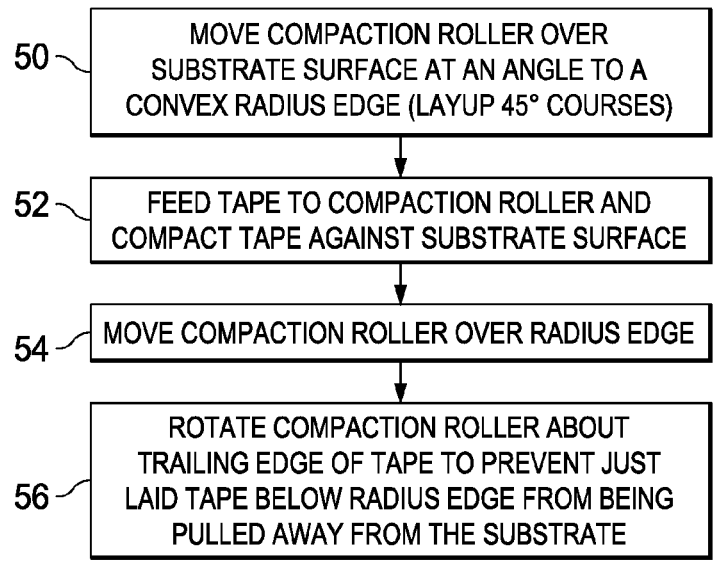
FIG. 5 is an illustration of a flow diagram of a method of laminating composite tape over a convex radius edge.
Figure 6:
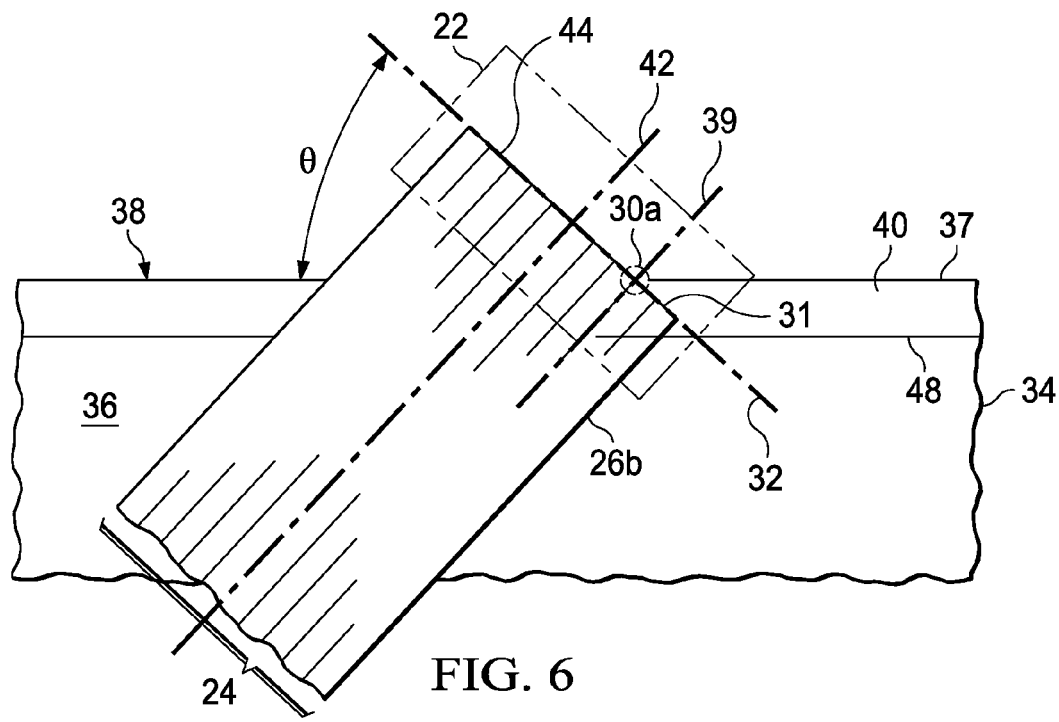
FIG. 6 is an illustration of a front view similar to FIG. 2, but showing a modified tool center point about which the compaction roller is pivoted as the radius edge is traversed by the compaction roller.
Figure 7:
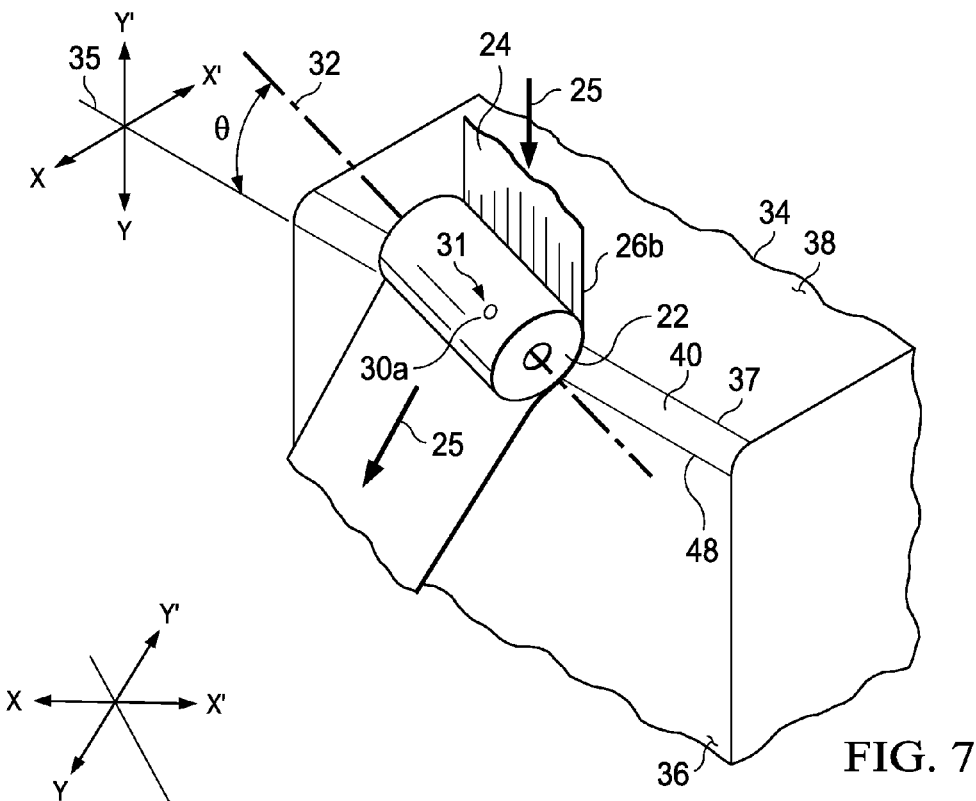
FIG. 7 is an illustration of a perspective view of a compaction roller beginning to traverse over the radius edge, according to the disclosed method.
Figure 8:
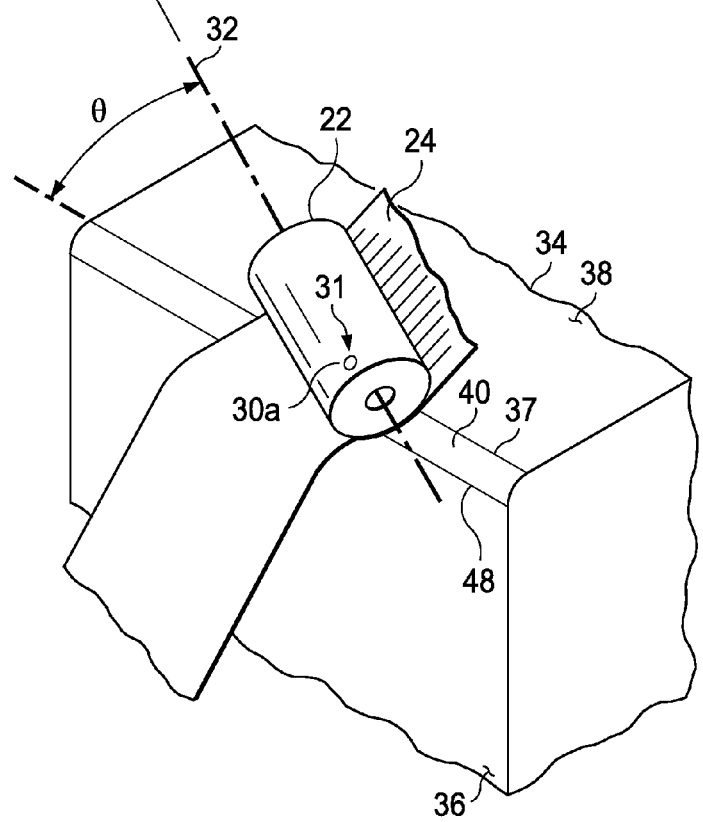
FIG. 8 is an illustration similar to FIG. 7, but showing the compaction roller having pivoted about the modified tool center point at the trailing edge of the conformal bandwidth.

Attention is now directed to FIGS. 5-8 which broadly illustrate a method of laminating composite tape over a convex radius edge 40, that avoids pulling the tape bandwidth 24 away from the substrate surface 36 to which it has been compacted, described previously in connection with FIGS. 2-4. Referring particularly to FIG. 5, the method begins at step 50 in which a compaction roller 22 or similar compaction device, is moved over a substrate surface 36 at an angle θ to a convex radius edge 40, such as when 45° tape courses are being placed to form a 45° ply. In FIGS. 6-8, the radius edge 40 is shown as a 90° radius, however it should be noted here that the disclosed method may be employed to laminate composite tape over convex radius edges of other relatively sharp angles. At step 52, composite prepreg tape is fed to the compaction roller 22 which compacts the tape against the substrate surface 36. At step 54, the compaction roller 22 moves over the convex radius edge 40. In step 56, the compaction roller 22 is rotated about the trailing edge 31 of the tape to prevent the just-laid tape below the radius edge 40 from being pulled away from the substrate surface 36.

FIGS. 7 and 8 illustrate further details of the method outlined in FIG. 6. In this example, modifications to the NC program 18 (FIG. 1) used to control the movements of the compaction roller 22 result in the relocation of the tool center point 30 along the axis of rotation 32 to the location designated as 30a, near the trailing edge 31 of the tape bandwidth 24. For example, the tool center point 30 may be aligned with the centerline 39 (FIG. 6) of the second-to-last tape strip 26b, or at other points along the trailing edge 31. When the modified tool center point 30a of the compaction roller 22 passes around the radius edge 40 in a sweep-like bending or wiping motion, the compaction roller 22 also pivots in the XZ plane about the Y axis through an angle φ (FIG. 8). Because the pivot point, i.e. the tool center point 30a, is located near the trailing edge 31 of the tape bandwidth 224 as the compaction roller 22 continues around the radius edge 40, minimal or no force is applied to the tape strips 26 at the trailing edge 31 which would tend to pull the just laid tape strips 26 away from the substrate surface 36. Instead, the coordinated movements of the compaction roller 22 about both the X and Y axes as it translates over the radius edge 40 results in compaction pressure being maintained across the entire tape bandwidth 24 until the compaction roller 22 has completely traversed the radius edge 40.

Figure 9:
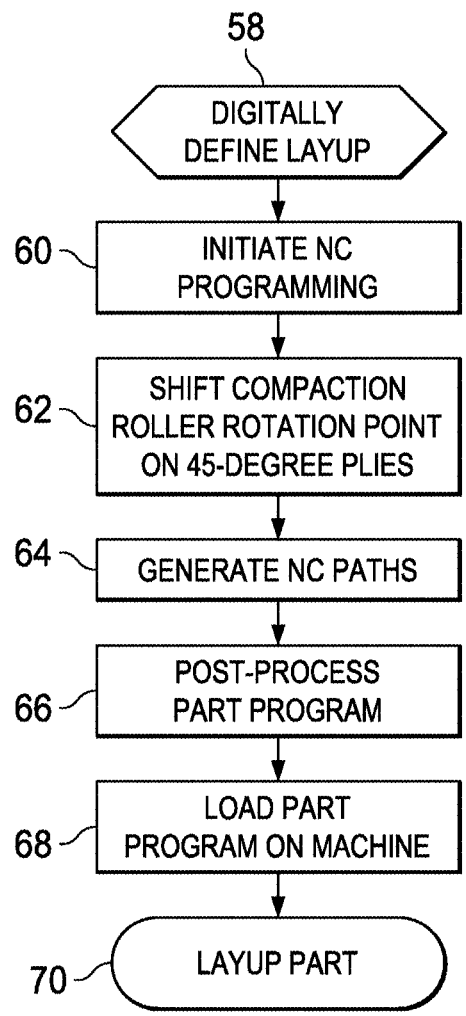
FIG. 9 is an illustration of an overall flow diagram of a method of laying up a composite part which employs the disclosed technique of rotating the compaction roller as it traverses a radius edge at an angle.

FIG. 9 illustrates an overall diagram of a method of laying up composite laminate parts using the method previously described in connection with FIGS. 5-8. Beginning at step 58, the desired of part layup is digitally defined, using for example and without limitation, a CAD system (not shown). At step 60, NC programming is initiated to produce a program suitable for controlling the operation and movements of the AFP machine. At 62, the NC programming is modified to shift the compaction roller rotation point (i.e. the tool center point 30) on 45° plies, such that the tool center point 30a is near the trailing edge 31 of the tape bandwidth 24 as the compaction roller 22 moves over the radius edge 40. At 64, the necessary and NC paths are generated which control the movement of the material placement head 20. At 66, the part program is post-processed, readying it for use for NC control of an AFP machine 12 used to layup the part. At step 68, the program is loaded into a controller 16 used to control the AFP machine 12, following which the part may be laid up at step 70.

Figure 10B:
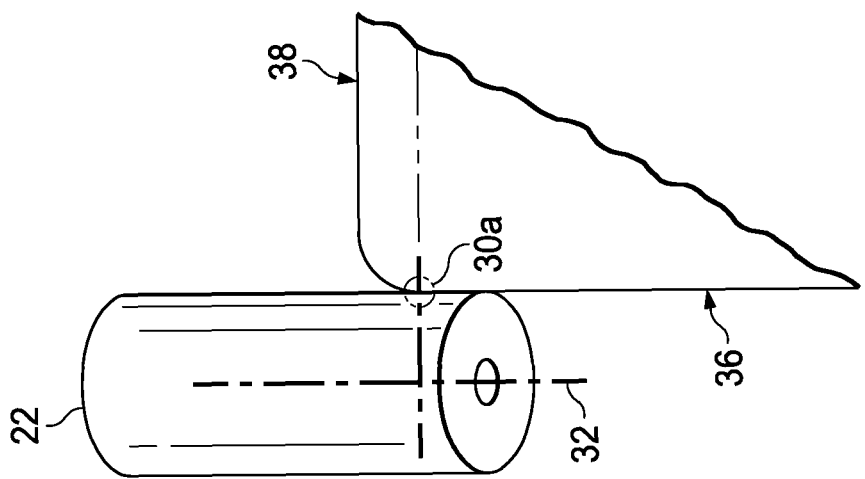
FIG. 10B is an illustration of a side view perspective of the embodiment depicted in FIG. 10A, but showing the position of the compaction roller prior to the start of rotation, clarifying the points of contact at the end of rotation.
Figure 10A:
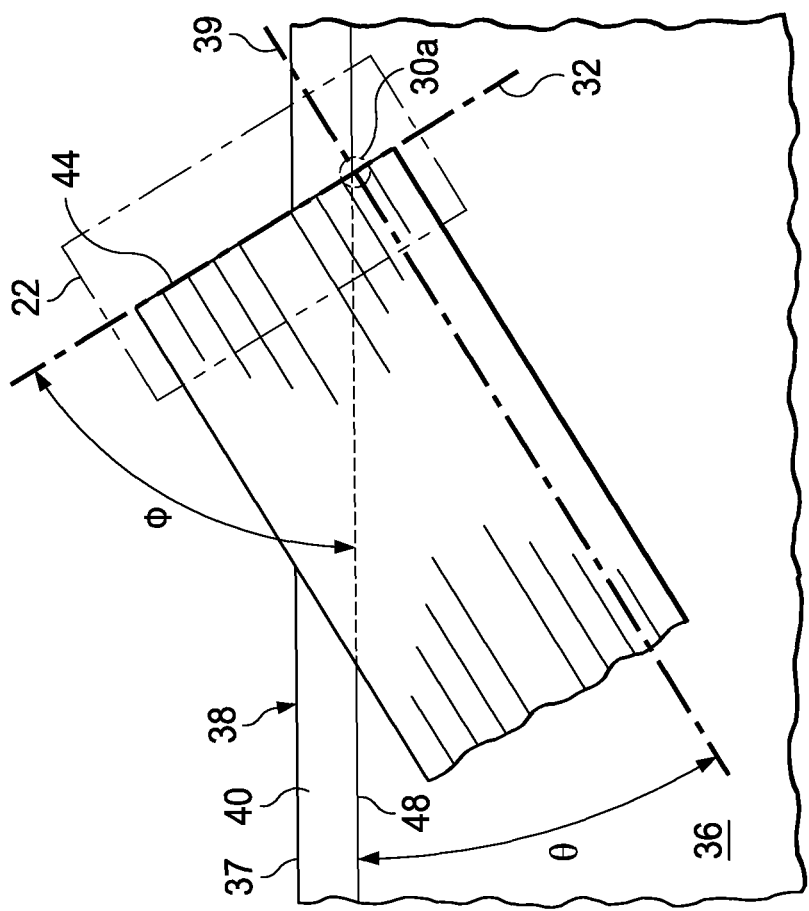
FIG. 10A is an illustration of a front view of a compaction roller which rotates around an axis of rotation that is angularly offset from a convex radius edge by a low angle less than 45° as the radius edge is traversed by the compaction roller in accordance with an illustrative embodiment.

FIGS. 10A and 10B illustrate a low angle less than 45° application of a lamina bandwidth. Herein, a low angle is defined as an angle that is less than 45° from a plane of reference. Similarly, a high angle is defined herein as an angle that is greater than 45° from a plane of reference. FIG. 10A illustrates in detail where path travel continues until the intersection of the axis of rotation 32 of the compaction roller 22 and the centerline 39 of the points along the trailing edge 31, as indicated by 30a. Furthermore, FIG. 10A depicts in detail, angle φ showing the angle compaction roller 22 pivoting in the XZ plane about the Y axis, when the modified tool center point 30a of the compaction roller 22 passes around the radius edge 40 in a sweep-like bending or wiping motion.

FIG. 10B illustrates a side view of contact prior to the start of rotation clarifying the points of contact. From this side view perspective, axis of rotation 32 of compaction roller 22 is not yet rotated, and therefore, does not yet intersect a centerline 39 of the points along a trailing edge 31 (not shown in detail in this illustration), although 30a generally indicates where this point of contact will be after rotation.

FIGS. 11A and 11B detail an exemplary embodiment performing a disclosed method where a compaction roller 22 is moved over a substrate surface 36 at an angle θ such as, but not limited to a low angle less than 45° to a convex radius edge 40. Moreover, FIG. 11A shows angle φ, the angle compaction roller 22 pivots in the XZ plane about the Y axis when the modified tool center point 30a of the compaction roller 22 passes around the radius edge 40 in a sweep-like bending or wiping motion. Further still, FIGS. 11A and 11B illustrate the start of rotation of compaction roller 22 about an axis of rotation 32 as the compaction roller 22 traverses trailing edge 31 of the tape along centerline 39 to prevent the just-laid tape below the radius edge 40, from being pulled away from the substrate 34. Stated differently, FIGS. 11A and 11B illustrate the start of rotation of compaction roller 22 about an axis of rotation 32 as the compaction roller traverses the radius edge to prevent the strips of tape just laid immediately preceding the current position of the compaction roller 22, at a time when the angle $\theta_1$ (not shown) between the fibers and the lines tangent to the radius is slightly different than the current angle $\theta$.

FIG. 12 illustrates the final position of the compaction roller 22 after full traversal of the convex radius edge 40. FIGS. 11A, 11B, and 12 show a detailed progression of step (156) of the method described in FIG. 14, below, according to the illustrated embodiment where $\theta$ is a low angle less than 45° to the convex radius edge 40.

Figure 13:
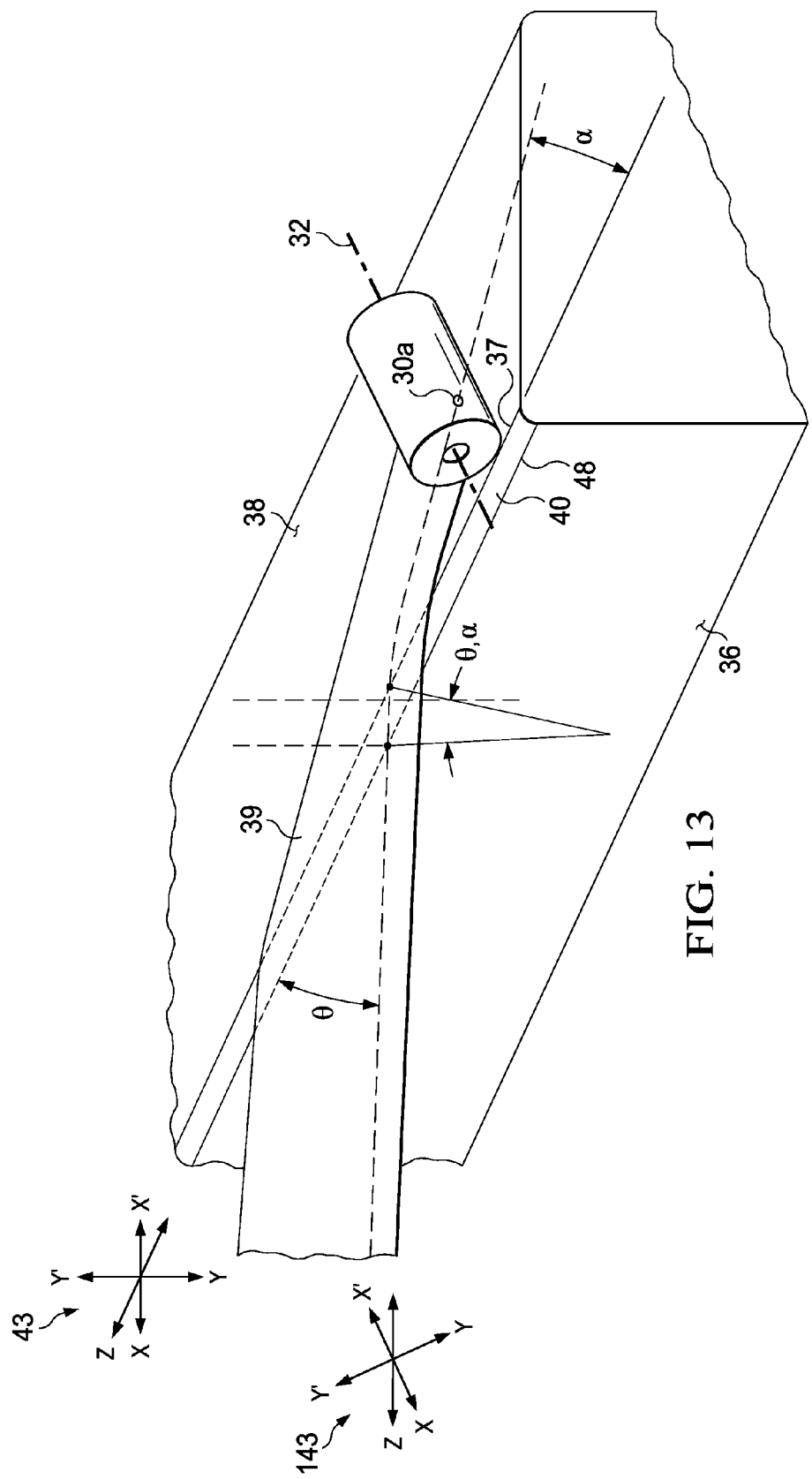
FIG. 13 is an isometric illustration of the angular path and the change of path as the compaction roller traverses the convex radius edge and translates to contact on the surface of the substrate.

Referring now to FIG. 13, this illustration maintains the exemplary embodiment as depicted in FIGS. 10A, 10B, 11A, 11B, and 12 where $\theta$ is a low angle less than 45° to the convex radius edge 40. FIG. 13 is an isometric of the angular path and change of path as the compaction roller 22 translates to contact on surface 38 of substrate 34. As used herein, the term isometric is defined as a visual representation of three-dimensional objects in two dimensions. Initial low angle less than 45° translates in three-dimensional coordinate system X, Y, Z in relation to $\theta$ and $\alpha$ until the compaction roller 22 is in contact on substrate surface 38 at final low angle $\alpha$. Angle $\phi$, the angle compaction roller 22 pivots in the XZ plane about the Y axis when the modified tool center point 30a of the compaction roller 22 passes around the radius edge 40 in a sweep-like bending or wiping motion, before translating into full contact on substrate surface 38, is not shown in FIG. 13, even though angle $\phi$ would indeed be present prior to the time compaction roller 22 fully transverses the radius edge and translates to full contact on substrate surface 38.

Figure 14:
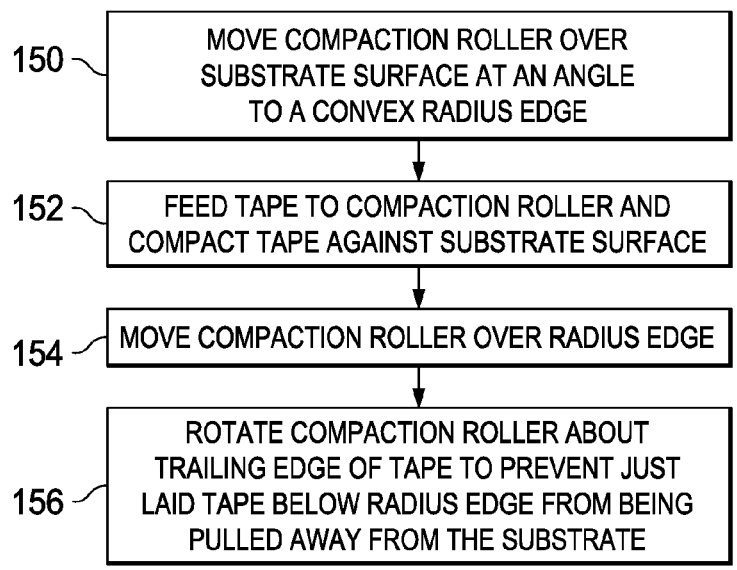
FIG. 14 is an illustration of a flow diagram of a method of laminating composite tape over a convex radius edge having a low angle less than 45°.

Referring next to FIG. 14, the method begins when a compaction roller 22 or similar compaction device, is moved over a substrate surface 36 at an angle $\theta$ to a convex radius edge 40, such as, but not limited to when the angle is a low angle less than 45° (operation 150). Next, composite prepreg tape is fed to the compaction roller 22 which compacts the tape against the substrate surface 36 (operation 152). Then, the compaction roller 22 moves over the convex radius edge 40 (operation 154). The compaction roller 22 is subsequently rotated about the trailing edge 31 of the tape to prevent the just-laid tape below the radius edge 40 from being pulled away from the substrate surface 36 (operation 156).

FIGS. 6, 7, 8, 10A, and 13 illustrate further details of the method outlined in FIG. 14. In this example, modifications to the NC program 18 (FIG. 1) used to control the movements of the compaction roller 22 result in the relocation of the tool center point 30 along the axis of rotation 32 to the location designated as 30a, near the trailing edge 31 of the tape bandwidth 24. FIG. 6, for example, shows the relocated tool center point 30a may be aligned with the centerline 39 of the second-to-last tape strip 26b. Relocated tool center point 30a may be aligned, instead, at other points along the trailing edge 31, as indicated by the varying location of point 30a in FIGS. 7, 8, 10A, and 13, respectively. When the modified tool center point 30a of the compaction roller 22 passes around the radius edge 40 in a sweep-like bending or wiping motion, the compaction roller 22 also pivots in the XZ plane about the Y axis through an angle $\phi$ (See FIGS. 10A and 11A for detailed illustration of angle $\phi$). Because the pivot point, i.e. the relocated the tool center point 30a is located near the trailing edge 31 of the tape bandwidth 24 as the compaction roller 22 continues around the radius edge 40, minimal or no force is applied to the tape strips 26 at the trailing edge 31 which would tend to pull the just laid tape strips 26 away from the substrate surface 36. Instead, the coordinated movements of the compaction roller 22 about both the X and Y axes as it translates over the radius edge 40 results in compaction pressure being maintained across the entire tape bandwidth 24 until the compaction roller 22 has completely traversed the radius edge 40.

Figure 15:
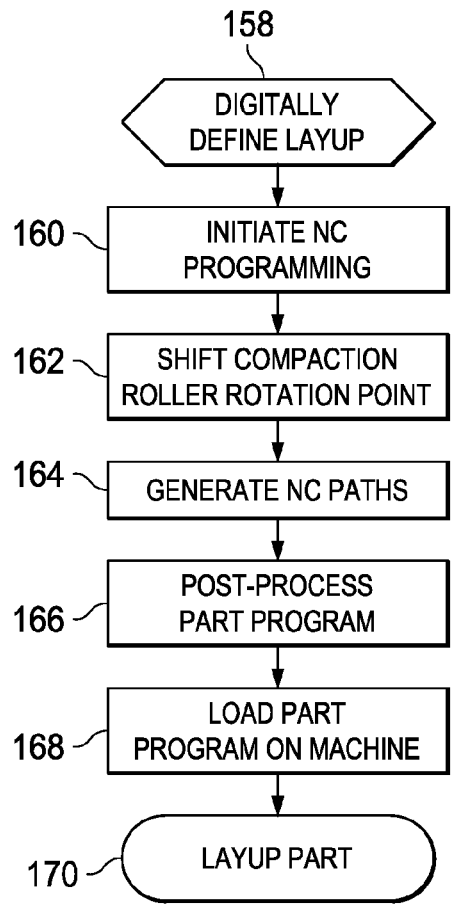
FIG. 15 is an illustration of an overall flow diagram of a method of laying up a composite part which employs the disclosed technique of rotating the compaction roller as it traverses a radius edge at a low angle less than 45°.

FIG. 15 illustrates an overall diagram of a method of laying up composite laminate parts according to an illustrated embodiment. First, the desired part layup is digitally defined, using for example and without limitation, a CAD system (not shown) (operation 158). Next, NC programming is initiated to produce a program suitable for controlling the operation and movements of the AFP machine (operation 160). Then the NC programming is modified to shift the compaction roller rotation point (i.e. the tool center point 30) on the plies, such that the tool center point 30a is near the trailing edge 31 of the tape bandwidth 24 as the compaction roller 22 moves over the radius edge 40 (operation 162). The necessary NC paths are then generated which control the movement of the material placement head 20 (operation 164). Next, the part program is post-processed, readying it for use for NC control of an AFP machine 12 used to layup the part (operation 166). Finally, the program is loaded into a controller 16 (operation 168) used to control the AFP machine 12, following which the part may be laid up (operation 170).

Although FIGS. 10A through 15, and particularly FIGS. 10A, 10B, 11A, 11B, 12, and 13, are directed toward an illustrated embodiment having an axis of rotation of the compaction roller that is angularly offset from the convex radius edge by a low angle less than 45°, the enclosed disclosure contemplates and teaches multiple other angles. This disclosure teaches generally a method of laminating composite tape over a convex radius edge, where the tape is applied with a fiber orientation that forms an angle, wherein the angle can be any angle ranging from 0° to 180° in a positive and negative direction relative to the convex radius edge. For example, another illustrated embodiment has an axis of rotation of the compaction roller that is angularly offset from the convex radius edge by a high angle greater than 45° (not specifically depicted in the figures).

Figure 16:
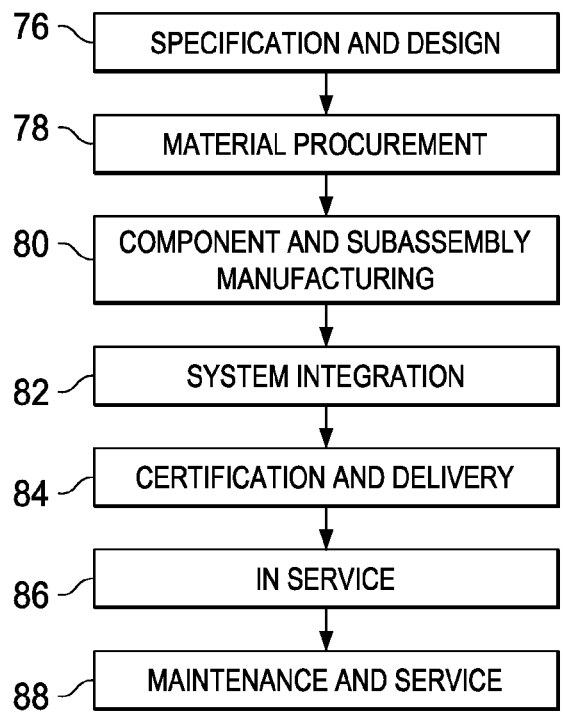
FIG. 16 is an illustration of a flow diagram of aircraft production and service methodology.
Figure 17:
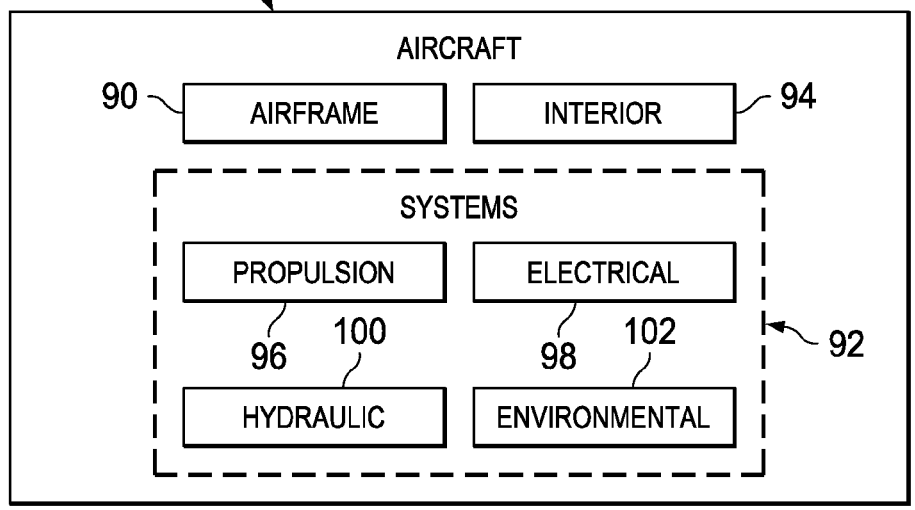
FIG. 17 is an illustration of a block diagram of an aircraft.

Embodiments of the disclosure may find use in a variety of potential applications, particularly in the transportation industry, including for example, aerospace, marine, automotive applications and other application where composite parts may be used. Thus, referring now to FIGS. 16 and 17, embodiments of the disclosure may be used in the context of an aircraft manufacturing and service method 72 as shown in FIG. 16 and an aircraft 74 as shown in FIG. 17. Aircraft applications of the disclosed embodiments may include, for example, without limitation, fabrication of stiffener members such as, without limitation beams, spars and stringers, to name only a few. During pre-production, exemplary method 72 may include specification and design 76 of the aircraft 74 and material procurement 78. During production, component and subassembly manufacturing 80 and system integration into of the aircraft 74 takes place. Thereafter, the aircraft 74 may go through certification and delivery 84 in order to be placed in service 86. While in service by a customer, the aircraft 74 is scheduled for routine maintenance and service 88, which may also include modification, reconfiguration, refurbishment, and so on.

Each of the processes of method 72 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 74 produced by exemplary method 72 may include an airframe 90 with a plurality of systems 92 and an interior 94. Examples of high-level systems 92 include one or more of a propulsion system 96, an electrical system 98, a hydraulic system 100, and an environmental system 102. Any number of other systems may be included. Although an aerospace example is shown, the principles of the disclosure may be applied to other industries, such as the marine and automotive industries.

Systems and methods embodied herein may be employed during any one or more of the stages of the production and service method 72. For example, components or subassemblies corresponding to production process 80 may be fabricated or manufactured in a manner similar to components or subassemblies produced while the aircraft 74 is in service. Also, one or more apparatus embodiments, method embodiments, or a combination thereof may be utilized during the production stages 80 and 82, for example, by substantially expediting assembly of or reducing the cost of an aircraft 74. Similarly, one or more of apparatus embodiments, method embodiments, or a combination thereof may be utilized while the aircraft 74 is in service, for example and without limitation, to maintenance and service 88.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

In a disclosed method of laminating composite tape over a convex radius edge on a substrate, the method comprises moving a material placement head over the substrate toward and around the convex radius edge, then laying down a bandwidth of composite tape strips on the substrate as the material placement head moves over the substrate and around the convex radius edge, including using a compaction roller to compact the composite tape strips against the substrate. The compaction roller has a longitudinal axis and a tool center point lying along the longitudinal axis at one end of the compaction roller and, additionally, the compaction roller has an axis of rotation that is angularly offset from the convex radius edge. The method next includes preventing the compaction roller from lifting off composite tape strips laid near the convex radius edge by pivoting the compaction roller around a trailing edge of the bandwidth in contact the convex radius edge, including pivoting the compaction roller about the tool center point, and folding the bandwidth as the material placement head moves around the convex radius edge. This method may further include laying down a bandwidth of tape strips, comprising laying down a plurality of tape strips side-by-side on the substrate and pivoting the compaction device at a point lying along one of the tape strips near an edge of the bandwidth. Additionally, pivoting the compaction roller can be performed as the material placement head moves around the convex radius edge. The method contemplates the axis of rotation of the compaction roller being angularly offset from the convex radius edge by less than 45°. Another exemplary embodiment includes the axis of rotation of the compaction roller being angularly offset from the convex radius edge by more than 45°. Furthermore, the contact between the compaction device and the substrate is maintained throughout the movement of the material placement head around the radius edge.

Another method of laying down prepreg fibers on a substrate having two surfaces connected by a radius edge, comprises moving a material placement head across a first substrate surface at an angle to the radius edge and then laying down a bandwidth of the prepreg fibers on the first substrate surface, including laying down strips of fiber tows in side-by-side, edge-to-edge contact with each other and compacting the strips of the fiber tows. Next, the material placement head is moved around the radius edge from the first substrate surface to a second substrate surface. Finally, the material placement head is pivoted about a point near one edge of the bandwidth of the prepreg fibers as the material placement head moves around the radius edge.

The additional actions of moving the material placement head from the radius edge across the second substrate surface at an angle to the radius edge and laying down a bandwidth of the prepreg fibers on the second substrate surface, can then be performed. Also, this disclosed method includes that the point about which the material placement head is pivoted is located within one of the strips of fiber tows near one edge of the bandwidth of prepreg fibers. Moreover, the compacting the strips of fiber tows is performed using a compaction roller, and pivoting the material placement head includes pivoting the compaction roller about a tool center point lying near one end of the compaction roller. Furthermore, this method comprises folding the bandwidth of prepreg fibers as the material placement head is moved around the radius edge from the first substrate surface to the second substrate surface. The angle of the movement of the material placement head to the radius edge can be a low angle less than 45° and, in the alternative, the angle of the movement of the material placement head to the radius edge can be a large angle greater than 45°.

Another method disclosed herein is a method of laminating composite tows over a convex radius using a material placement head having a compaction roller, comprising moving the material placement head around the convex radius as composite tows are being laminated in a bandwidth over the convex radius and pivoting the compaction roller having an axis of rotation that is angularly offset from the convex radius edge at a location across the bandwidth that prevents the compaction roller from lifting off the composite tows laid just before the material placement head begins moving around the convex radius. Next, folding the bandwidth of composite tows as the compaction roller moves around the convex radius can complete this method. However, the method also contemplates the location across the bandwidth about which the compaction roller is pivoted as being between a center tow and a last tow along a trailing edge of the bandwidth and wherein the axis of rotation of the compaction roller is angularly offset from the convex radius edge by a low angle less than 45° or, in the alternative, by a high angle greater than 45°.

An additional method of laminating composite tape over a convex radius using a tape laminating machine having a compaction roller, comprises using a processor for programming the tape laminating machine to move along a path over a substrate, using the processor for directing the compaction roller to move along the path and pivot around a trailing edge of the tape that contacts the convex radius to prevent the compaction roller from lifting off the tape laid just before the convex radius, and using the processor, for folding the tape as the compaction roller moves over the convex radius. Additionally, the processor can be used for generating a digital definition of a composite layup having a convex radius. Then, the method could include using the tape laminating machine to layup composite plies of according to the generated digital definition of the composite layup. Moreover, programming the tape laminating machine can include programming the tape laminating machine to move along a modified path for laying up plies having a low angle less than 45° fiber orientation or programming the tape laminating machine to move along a conventional path for laying up plies having an angle greater than 45° fiber orientation. Finally, this disclosed method includes wherein directing the compaction roller to move along the path and pivot around a trailing edge of the tape is performed while folding the tape as the compaction roller moves over the convex radius.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of laminating composite tape over a convex radius edge on a substrate, comprising:
   moving a material placement head over the substrate toward and around the convex radius edge;
   laying down a bandwidth of composite tape strips on the substrate as the material placement head moves over the substrate and around the convex radius edge, including using a compaction roller to compact the composite tape strips against the substrate, wherein the compaction roller has a longitudinal axis and a tool center point lying along the longitudinal axis at one end of the compaction roller, the compaction roller having an axis of rotation that is angularly offset from the convex radius edge;
   preventing the compaction roller from lifting off the composite tape strips laid near the convex radius edge by pivoting the compaction roller about a pivot axis through the tool center point while in contact with the convex radius edge, including pivoting the compaction roller about the tool center point, wherein the tool center point is located between a center strip and a last strip of the bandwidth and wherein the pivot axis is perpendicular to the convex radius edge; and
   folding the bandwidth as the material placement head moves around the convex radius edge.

2. The method of claim 1, wherein:
   laying down the bandwidth of the composite tape strips further includes laying down a plurality of tape strips side-by-side on the substrate.

3. The method of claim 1, wherein pivoting the compaction roller is performed as the material placement head moves around the convex radius edge.

4. The method of claim 1, wherein the axis of rotation of the compaction roller is angularly offset from the convex radius edge by a low angle less than 45°.

5. The method of claim 1, wherein the axis of rotation of the compaction roller is angularly offset from the convex radius edge by a high angle greater than 45°.

6. The method of claim 1, wherein contact between the compaction roller and the substrate is maintained throughout movement of the material placement head around the radius edge.

7. A method of laying down prepreg fibers on a substrate having two surfaces connected by a radius edge, comprising:
   moving a material placement head across a first substrate surface at an angle to the radius edge, the material placement head having a compaction roller;
   laying down a bandwidth of the prepreg fibers on the first substrate surface, comprising laying down strips of fiber tows in side-by-side, edge-to-edge contact with each other and compacting the strips of the fiber tows;
   moving the material placement head around the radius edge from the first substrate surface to a second substrate surface; and
   pivoting the material placement head about an axis through a pivot point of the compaction roller, the pivot point located along an axis of rotation of the compaction roller between a center of the compaction roller and an edge of the bandwidth of the prepreg fibers as the material placement head moves around the radius edge, wherein the axis is perpendicular to the axis of rotation of the compaction roller.

8. The method of claim 7, further comprising:
   moving the material placement head from the radius edge across the second substrate surface at the angle to the radius edge; and
   laying down the bandwidth of the prepreg fibers on the second substrate surface.

9. The method of claim 7, wherein the pivot point of the compaction roller is located within one of the strips of fiber tows near one edge of the bandwidth of the prepreg fibers.

10. The method of claim 7, wherein compacting the strips of fiber tows is performed using a compaction roller, and pivoting the material placement head includes pivoting the compaction roller about a tool center point lying near one end of the compaction roller.

11. The method of claim 7, further comprising:
    folding the bandwidth of the prepreg fibers as the material placement head is moved around the radius edge from the first substrate surface to the second substrate surface.

12. The method of claim 7, wherein an angle of movement of the material placement head to the radius edge is a low angle less than 45°.

13. The method of claim 8, wherein an angle of movement of the material placement head to the radius edge is a high angle greater than 45°.

14. A method of laminating composite tows over a convex radius using a material placement head having a compaction roller, comprising:

moving the material placement head across a first substrate surface at an angle to an edge of the convex radius;

laying down the composite tows on the first substrate surface;

moving the material placement head around the convex radius as the composite tows are being laminated in a bandwidth over the edge of the convex radius;

pivoting the compaction roller having an axis of rotation that is angularly offset from the edge of the convex radius about a pivot axis through a pivot point that prevents the compaction roller from lifting off the composite tows laid just before the material placement head begins moving around the convex radius, wherein the pivot axis is perpendicular to the axis of rotation of the compaction roller; and folding the bandwidth of the composite tows as the compaction roller moves around the convex radius.

15. The method of claim 14, wherein a location across the bandwidth about which the compaction roller is pivoted is between a center tow and a last tow along a trailing edge of the bandwidth and wherein the axis of rotation of the compaction roller is angularly offset from the edge of the convex radius by a low angle less than 45°.

16. The method of claim 14, wherein a location across the bandwidth about which the compaction roller is pivoted is between a center tow and a last tow along a trailing edge of the bandwidth and wherein the axis of rotation of the compaction roller is angularly offset from the edge of the convex radius by a high angle greater than 45°.

17. A method of laminating composite tape over a convex radius using a tape laminating machine having a compaction roller, comprising:

using a processor, programming the tape laminating machine to move along a path over a substrate;

using the processor, directing the compaction roller to move along the path and pivot around an axis through a pivot point in contact with and edge of the convex radius, the pivot point located between a center strip and a last strip of the tape to prevent the compaction roller from lifting off the tape laid just before the convex radius, wherein the axis is perpendicular to an edge of the convex radius; and using the processor, folding the tape as the compaction roller moves over the convex radius.

18. The method of claim 17, further comprising:

generating a digital definition of a composite layup having the convex radius; and using the tape laminating machine to layup composite plies according to the generated digital definition of the composite layup.

19. The method of claim 17, wherein programming the tape laminating machine includes:

programming the tape laminating machine to move along a modified path for laying up plies having a low angle less than 45° fiber orientation; and programming the tape laminating machine to move along a conventional path for laying up plies having a high angle greater than 45° fiber orientation.

20. The method of claim 17, wherein directing the compaction roller to move along the path and pivot around a trailing edge of the tape is performed while folding the tape as the compaction roller moves over the convex radius.

* * * * *